United States Patent
Shen et al.

(10) Patent No.: US 10,437,994 B1
(45) Date of Patent: Oct. 8, 2019

(54) SYSTEMS AND METHODS FOR DETERMINING THE REPUTATIONS OF UNKNOWN FILES

(71) Applicant: Symantec Corporation, Mountain View, CA (US)

(72) Inventors: Yun Shen, Briston (GB); Yufei Han, Antibes (FR); Pierre-Antoine Vervier, Alpes-Maritimes (FR)

(73) Assignee: Symantec Corporation, Mountain View, CA (US)

( * ) Notice: Subject to any disclaimer, the term of this patent is extended or adjusted under 35 U.S.C. 154(b) by 198 days.

(21) Appl. No.: 15/163,720

(22) Filed: May 25, 2016

(51) Int. Cl.
 *G06F 21/00* (2013.01)
 *G06F 21/56* (2013.01)
 *G06F 21/55* (2013.01)

(52) U.S. Cl.
 CPC ............ *G06F 21/56* (2013.01); *G06F 21/552* (2013.01); *G06F 21/568* (2013.01); *G06F 2221/033* (2013.01)

(58) Field of Classification Search
 None
 See application file for complete search history.

(56) References Cited

U.S. PATENT DOCUMENTS

| | | | | |
|---|---|---|---|---|
| 10,057,279 | B1 * | 8/2018 | Balduzzi ............ | H04L 63/1416 |
| 2011/0185016 | A1 * | 7/2011 | Kandasamy ........... | G06Q 10/06 709/203 |
| 2015/0205964 | A1 * | 7/2015 | Eytan .................... | G06F 21/568 726/23 |

OTHER PUBLICATIONS

Duen Horng "Polo" Chau, Carey Nachenberg, Jeffrey Wilhelm, Adam Wright, and Christos, Polonium: Tera-Scale Graph Mining and Inference for Malware Detection, Proceedings of the 2011 SIAM International Conference on Data Mining. 2011, p. 131-142 (Year: 2011).*
Yun Shen, et al.; Systems and Methods for Identifying Malicious File Droppers; U.S. Appl. No. 15/064,633, filed Mar. 9, 2016.
Luca Invernizzi, et al; EVILSEED: A Guided Approach to Finding Malicious Web Pages; In IEEE Symposium on Security and Privacy, SP 2012; (May 21-23, 2012).
B. J. Kwon, et al.; The dropper effect: Insights into malware distribution with downloader graph analytics; In Proceedings of the 22nd ACM SIGSAC Conference on Computer and Communications Security, CCS '15; (Oct. 12-16, 2015).
Luca Invernizzi, et al.; Nazca: Detecting Malware Distribution in Large-Scale Networks; In 21st Annual Network and Distributed System Security Symposium, NDSS 2014; (Feb. 23-26, 2014).

* cited by examiner

*Primary Examiner* — Alexander Lagor
(74) *Attorney, Agent, or Firm* — FisherBroyles, LLP

(57) ABSTRACT

The disclosed computer-implemented method for determining the reputations of unknown files may include (1) identifying a file that was downloaded by the computing device from an external file host, (2) creating a node that represents the file in a dynamic file relationship graph, (3) connecting the node in the dynamic file relationship graph with at least one other node that represents an attribute of the external file host, and (4) labeling the node with a reputation score calculated based at least in part on a reputation score of the at least one other node that represents the attribute of the external file host. Various other methods, systems, and computer-readable media are also disclosed.

19 Claims, 7 Drawing Sheets

SYSTEMS AND METHODS FOR DETERMINING THE REPUTATIONS OF UNKNOWN FILES

BACKGROUND

Viruses, Trojans, spyware, and other kinds of malware are a constant threat to any computing device that requires network connectivity. Many different types of security systems exist to combat these threats, ranging from browser plug-ins to virus scanners to firewalls, and beyond. Countless new instances and permutations of malware are created every day, requiring security systems to be constantly updated. Despite all this, many pieces of malware still manage to infect computing devices and carry out a variety of malicious actions.

Unfortunately, traditional systems for identifying malicious files may rely on techniques that are quickly adapted to by attackers. For example, traditional systems that identify malicious files via signatures must have an appropriate signature in order to identify a malicious file and may not be effective unless frequently updated. Similarly, traditional systems that detect malicious files based on heuristics may be unable to identify malicious files that have not yet taken malicious actions. Some traditional systems may be unable to classify a file as malicious or benign until the file has been observed a large number of times. Traditional systems that are unable to immediately identify new malicious files may leave computing devices vulnerable to attack. Accordingly, the instant disclosure identifies and addresses a need for additional and improved systems and methods for determining the reputations of unknown files.

SUMMARY

As will be described in greater detail below, the instant disclosure describes various systems and methods for determining the reputations of unknown files by propagating reputation labels across a dynamic file relationship graph.

In one example, a computer-implemented method for determining the reputations of unknown files may include (1) identifying a file that was downloaded by the computing device from an external file host, (2) creating a node that represents the file in a dynamic file relationship graph, (3) connecting the node in the dynamic file relationship graph with at least one other node that represents an attribute of the external file host, and (4) labeling the node with a reputation score calculated based at least in part on a reputation score of the at least one other node that represents the attribute of the external file host.

In one embodiment, the computer-implemented method may further include determining, based on the reputation score, that the file is malicious. In some examples, the computer-implemented method may further include performing a security action on the file in response to determining that the file is malicious.

In some examples, identifying the file may include determining that reputation data for the file is not currently stored in the dynamic file relationship graph. In some embodiments, labeling the node with the reputation score may include averaging a reputation score for each node that is connected to the node. In one embodiment, the reputation score may include a percentage probability that the file is malicious. In some embodiments, the computer-implemented method may further include, in response to labelling the node with the reputation score, labelling an unlabeled node that is connected to the node with a new reputation score that is calculated at least in part using the reputation score for the node.

In some embodiments, connecting the node with the other node may include creating the other node that represents the attribute of the external file host. In some examples, creating the other node may include connecting the other node with at least one additional node that represents at least one additional attribute of the external file host. In some examples, connecting the node with the other node may include labeling an edge between the node and the other node with a timestamp of the current time. In one embodiment, the attribute of the external file host may include (1) an additional file downloaded from the external file host, (2) an Internet protocol (IP) address of the external file host, (3) a uniform resource locator (URL) of the external file host, and/or (4) a referrer URL of the external file host.

In one embodiment, a system for implementing the above-described method may include (1) an identification module, stored in memory, that identifies a file that was downloaded by the computing device from an external file host, (2) a creation module, stored in memory, that creates a node that represents the file in a dynamic file relationship graph, (3) a connection module, stored in memory, that connects the node in the dynamic file relationship graph with at least one other node that represents an attribute of the external file host, (4) a labeling module, stored in memory, that labels the node with a reputation score calculated based at least in part on a reputation score of the at least one other node that represents the attribute of the external file host, and (5) at least one physical processor configured to execute the identification module, the creation module, the connection module, and the labeling module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a file that was downloaded by the computing device from an external file host, (2) create a node that represents the file in a dynamic file relationship graph, (3) connect the node in the dynamic file relationship graph with at least one other node that represents an attribute of the external file host, and (4) label the node with a reputation score calculated based at least in part on a reputation score of the at least one other node that represents the attribute of the external file host.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
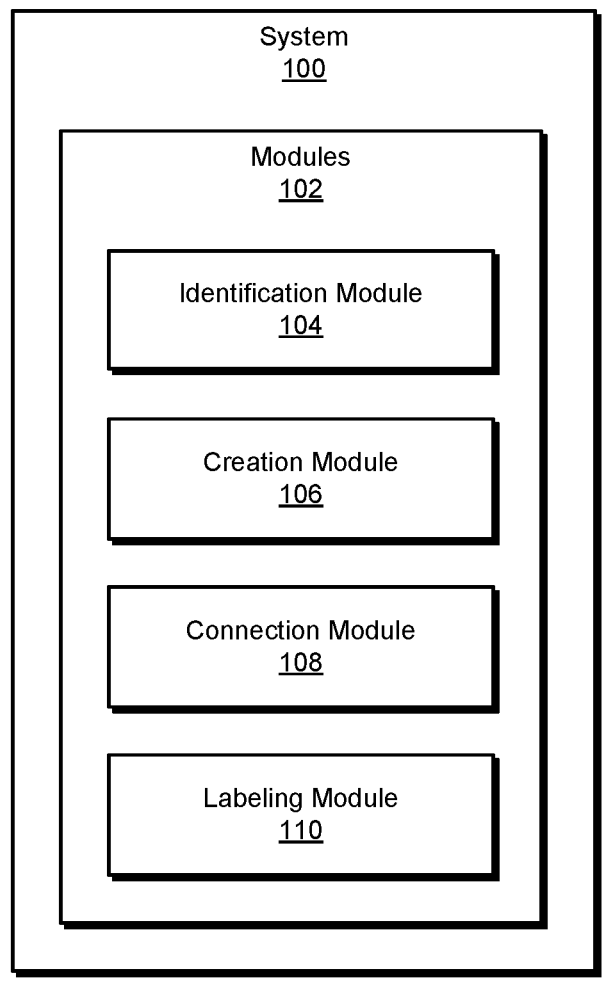
FIG. 1 is a block diagram of an exemplary system for determining the reputations of unknown files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining the reputations of unknown files. As will be explained in greater detail below, by using a file relationship graph to propagate reputation scores from known files to unknown files, the systems and methods described herein may accurately and quickly label unknown files as malicious or benign.

The following will provide, with reference to FIGS. 1, 2, 4, and 5, detailed descriptions of exemplary systems for determining the reputations of unknown files. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for determining the reputations of unknown files. As illustrated in this figure, exemplary system 100 may include one or more modules 102 for performing one or more tasks. For example, and as will be explained in greater detail below, exemplary system 100 may include an identification module 104 that identifies a file that was downloaded by the computing device from an external file host. Exemplary system 100 may additionally include a creation module 106 that creates a node that represents the file in a dynamic file relationship graph. Exemplary system 100 may also include a connection module 108 that connects the node in the dynamic file relationship graph with at least one other node that represents an attribute of the external file host. Exemplary system 100 may additionally include a labeling module 110 that labels the node with a reputation score calculated based at least in part on a reputation score of the at least one other node that represents the attribute of the external file host. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
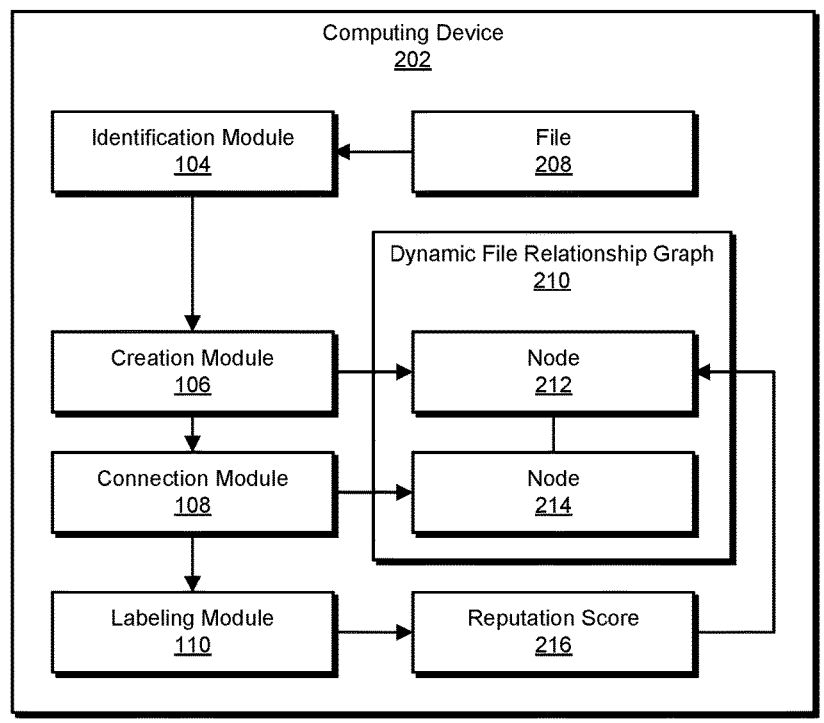
FIG. 2 is a block diagram of an additional exemplary system for determining the reputations of unknown files.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to determine the reputations of unknown files. For example, and as will be described in greater detail below, identification module 104 may identify a file 208 that was downloaded by computing device 202 from an external file host 206. Next, creation module 106 may create a node 212 that represents file 208 in a dynamic file relationship graph 210. Immediately afterwards, connection module 108 may connect node 212 in dynamic file relationship graph 210 with at least one other node 214 that represents an attribute of external file host 206. Immediately or at a later time, labeling module 110 may label node 212 with a reputation score 216 calculated based at least in part on a reputation score 216 of node 214 that represents an attribute of external file host 206.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
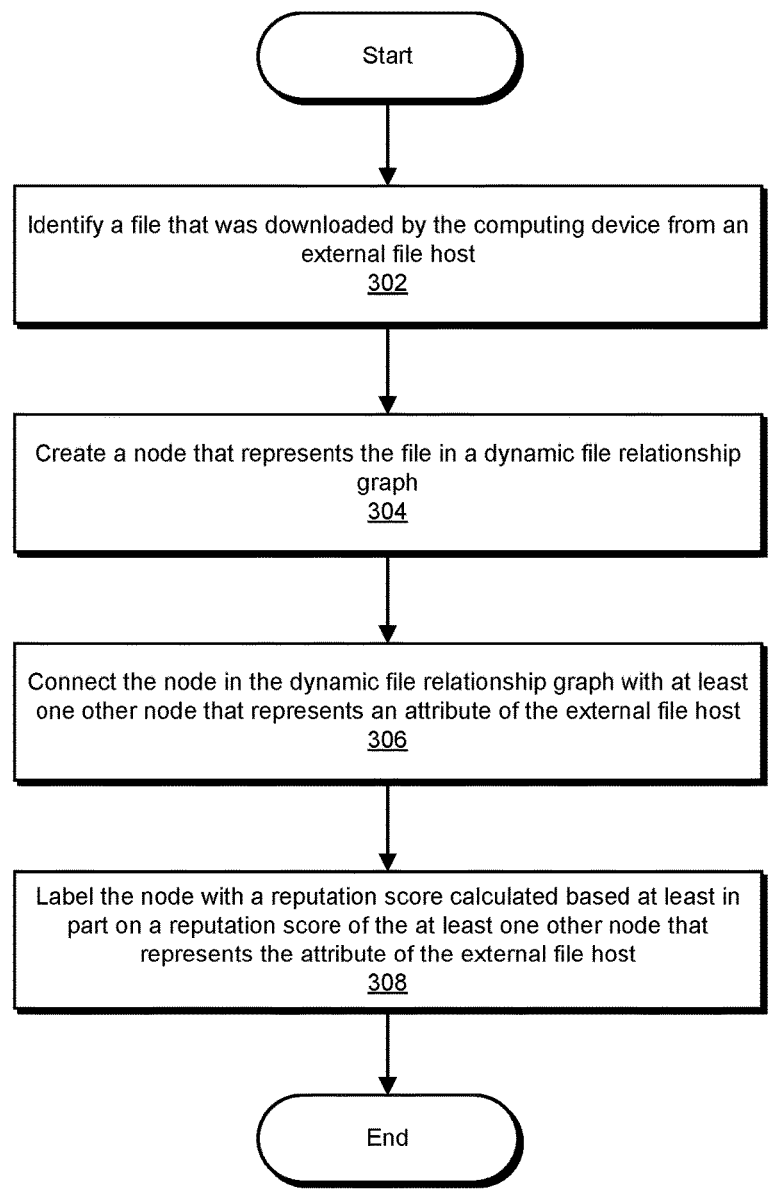
FIG. 3 is a flow diagram of an exemplary method for determining the reputations of unknown files.

FIG. 3 is a flow diagram of an exemplary computer-implemented method 300 for determining the reputations of unknown files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a file that was downloaded by the computing device from an external file host. For example, identification module 104 may, as part of computing device 202 in FIG. 2, identify file 208 that was downloaded by computing device 202 from external file host 206.

The term "external file host," as used herein, generally refers to any source of files outside of the computing device that hosts the systems described herein. In some embodiments, an external file host may include a server. Additionally or alternatively, an external file host may include a website, an IP address, a network, a domain name, and/or another computing device.

Identification module 104 may identify the file that was downloaded from the external file host in a variety of ways and contexts. For example, identification module 104 may be part of a firewall, anti-malware application, and/or other security application that may scrutinize all file downloads and/or transfers. In some examples, identification module 104 may identify a file that a user has downloaded from a website via a browser and/or from a server via a file transfer client. In other examples, identification module 104 may identify a file that was downloaded by an application.

In some examples, identification module 104 may identify the file by determining that reputation data for the file is not currently stored in the dynamic file relationship graph. In one example, identification module 104 may determine that the file has not been identified before by the systems described herein and/or other security systems. In another example, identification module 104 may determine that the file has been previously identified but has not been observed sufficiently to have had reputation data calculated for the file. For example, identification module 104 may determine that the file has only been observed twice by the systems described herein.

At step 304, one or more of the systems described herein may create a node that represents the file in a dynamic file relationship graph. For example, creation module 106 may, as part of computing device 202 in FIG. 2, create node 212 that represents file 208 in dynamic file relationship graph 210.

The term "dynamic file relationship graph," as used herein, generally refers to any data structure that includes data on files and relationships between files and other objects and that can be updated with new information. In some embodiments, a dynamic file relationship graph may include a directed graph (i.e., with directed connections between nodes), an undirected graph (i.e., with undirected connections between nodes), and/or a network graph with weighted edges. In one embodiment, a dynamic file relationship graph may include connections between files and related objects such as URLs, IP addresses, other files, computing devices, domain names, and/or other relevant objects. In some embodiments, a dynamic file relationship graph may also include connections between non-file objects and other non-file objects, such as between any two of the examples listed above. In some embodiments, a dynamic file relationship graph may include nodes representing files downloaded by multiple different computing devices. For example, a dynamic file relationship graph may include nodes representing files downloaded by all of the computing devices that have a specific security application installed.

Creation module 106 may create a node in a dynamic file relationship graph in a variety of ways. For example, creation module 106 may create a node as part of creating a new dynamic file relationship graph if no such graph already exists. In another example, creation module 106 may create a node as part of an existing dynamic file relationship graph that already includes multiple nodes and connections between nodes. In some embodiments, creation module 106 may create a node that includes various types of information about the file such as the name of the file, a hash of the file, a fingerprint of the file, an identifier of the computing device that downloaded the file, the size of the file, a timestamp of the download of the file, reputation data about the file obtained from other sources, and/or any other information about the file.

At step 306, one or more of the systems described herein may connect the node in the dynamic file relationship graph with at least one other node that represents an attribute of the external file host. For example, connection module 108 may, as part of computing device 202 in FIG. 2, connect node 212 in dynamic file relationship graph 210 with at least one other node 214 that represents an attribute of external file host 206.

The term "attribute," as used herein, generally refers to any feature of the external file host and/or information about the external file host. Examples of an attribute may include, without limitation, an IP address, a URL, a referrer URL, a domain name, and/or an additional file downloaded from the external file host.

Connection module 108 may connect the node representing the file with the other node in a variety of contexts. In some examples, connection module 108 may connect the node with the other node by creating the other node that represents the attribute of the external file host. For example, connection module 108 may create a node that represents the IP address of the external file host if the systems described herein had not previously observed the IP address of the external file host. In other examples, connection module 108 may connect the node with an existing other node. For example, the IP address of the external file host may already be represented by a node in the dynamic file relationship graph due to another file having been previously downloaded from the same IP address.

Figure 4:
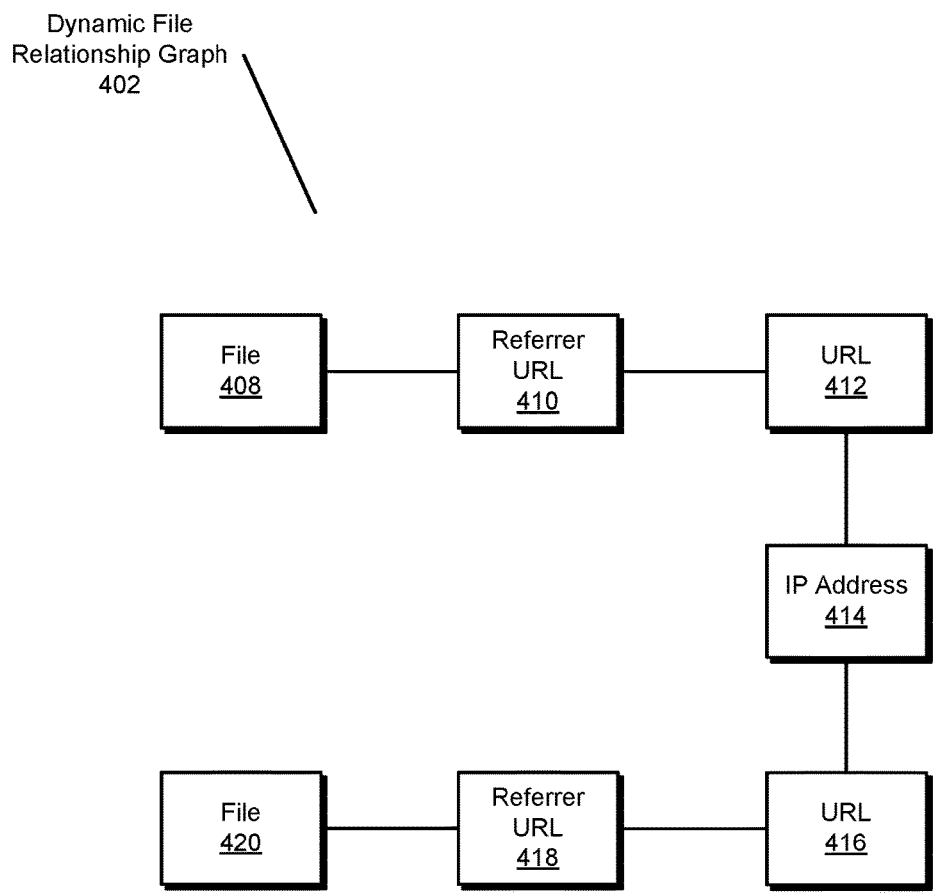
FIG. 4 is a block diagram of an exemplary computing system for determining the reputations of unknown files.

In examples where connection module 108 creates a new node to represent the attribute of the external file host, connection module 108 may also connect the other node with one or more existing and/or new nodes that represent additional attributes of the external file host. For example, as illustrated in FIG. 4, connection module 108 may connect a node representing file 408 with a node representing referrer URL 410 in a dynamic file relationship graph 402. In some examples, connection module 108 may create the node representing referrer URL 410 and/or a node representing URL 412 from which the file was downloaded. In one example, connection module 108 may also connect URL 412 to a node representing IP address 414, which may already be connected to nodes representing URL 416, referrer URL 418, and/or file 420. In some embodiments, each node may also be connected to additional other nodes. For example, connection module 108 may also connect file 408 to URL 412, IP address 414, and/or file 420.

In some embodiments, connection module 108 may, when connecting one node to another, label an edge between the nodes with a timestamp of the current time. In these embodiments, the systems described herein may be able to display and/or search the dynamic file relationship graph based on when new nodes and/or connections were added to the graph. For example, connection module 108 may label all new edges with the time those edges were added and the systems described herein may allow an analyst to search for all data that was added within a certain date range. In another example, the systems described herein may visually display the growth of the graph over time by using the timestamp data added to the edges by connection module 108.

Returning to FIG. 3, at step 308, one or more of the systems described herein may label the node with a reputation score calculated based at least in part on a reputation score of the at least one other node that represents the attribute of the external file host. For example, labeling module 110 may, as part of computing device 202 in FIG. 2, label node 212 with reputation score 216 calculated based at least in part on reputation score 216 of node 214.

The term "reputation score," as used herein, generally refers to any representation of an object's likelihood of being malicious or benign. In some embodiments, the reputation score may include a percentage probability that the object is malicious. For example, a node may have a reputation score indicating that the file represented by the node is 90% likely to be malicious. Additionally or alternatively, a reputation score may include a categorization system (e.g., "malicious," "benign," "neutral," and/or "unknown"), a numerical total, a tag, and/or any combination of the above. In some embodiments, each node in a dynamic file reputation graph may have or may be capable of having a reputation score.

Labeling module 110 may calculate a reputation score for the node in a variety of ways. For example, labeling module 110 may calculate the reputation score for the node by averaging a reputation score for each node that is connected to the node. In some embodiments, labeling module 110 may only label a node that is connected to a number of other nodes with reputation scores that exceeds a threshold for connected nodes with reputations. For example, labelling module 110 may not label a node that is connected only to other nodes with no reputations or to only one node with a reputation, but maybe label a node that is connected to three other nodes with reputations. In one example, an unlabeled node (e.g., representing a file) may be connected to three other nodes (e.g., representing a server and two other files downloaded from that server) that have labels indicating an 80%, 73%, and 92% chance of being malicious, respectively. In this example, labelling module 110 may label the unlabeled node as 82% likely to be malicious.

In one embodiment, labelling module 110 may, in response to labelling the node with the reputation score, label an unlabeled node that is connected to the node with a new reputation score that is calculated at least in part using the reputation score for the node. In some examples, labelling module 110 may propagate reputation scores across multiple nodes as new reputations cores are calculated and added. In some embodiments, labelling module 110 may also update reputation scores for previously-labelled nodes in addition to assigning new reputation scores to unlabeled nodes.

Figure 5:
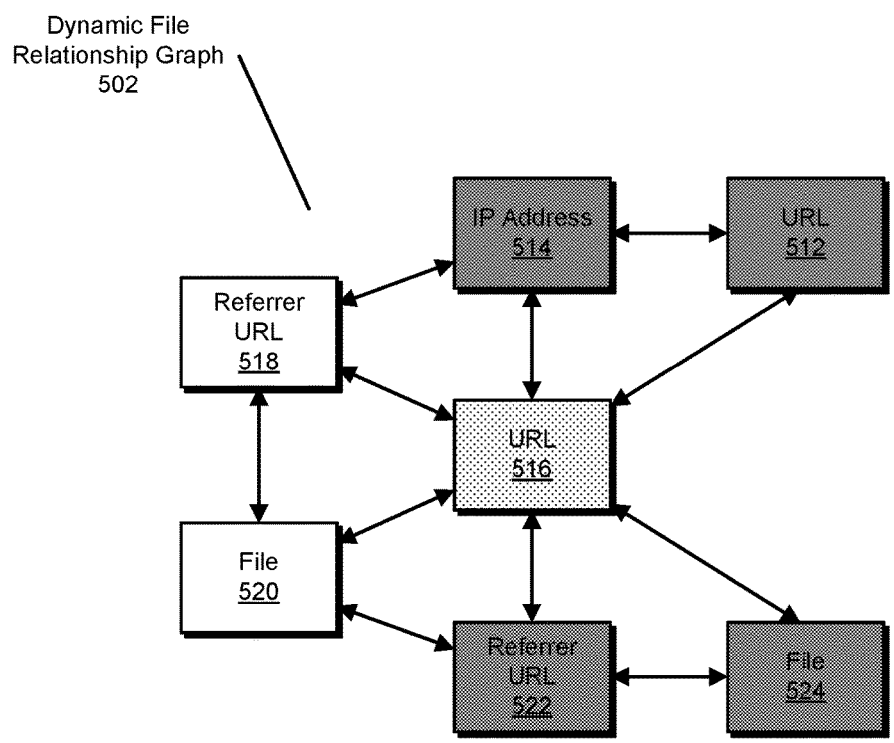
FIG. 5 is a block diagram of an exemplary computing system for determining the reputations of unknown files.

For example, as illustrated in FIG. 5, labelling module 110 may label URL 516 in dynamic file relationship graph 502 based on the reputation scores of IP address 514, URL 512, referrer URL 522, and/or file 524. In some embodiments, after labelling URL 516 with a reputation score, labelling module 110 may then label file 520 with a reputation score based on the reputation scores of URL 516 and/or referrer URL 522. Additionally or alternatively, labelling module 110 may label referrer URL 518 with a reputation score based on the reputation scores of URL 516, IP address 514, and/or file 520.

In some embodiments, labelling module 110 and/or the other systems described herein may run in parallel on server clusters for increased efficiency. In these embodiments, the dynamic file relationship graph may be spread throughout and/or copied to multiple servers and/or computing devices.

In one embodiment, systems described herein may determine, based on the reputation score, that the file is malicious. In some embodiments, the systems described herein may determine that any file with a reputation score above a predefined threshold of probability for maliciousness is a malicious file. For example, the systems described herein may determine that any file that is at least 80% likely to be malicious will be categorized as a malicious file. In some embodiments, the systems described herein may also classify other objects, such as URLs, domain names, and/or IP addresses, as malicious.

In some examples, systems described herein may perform a security action on the file in response to determining that the file is malicious. For example, the systems described herein may prevent the file from performing any actions on the computing device, alert an administrator to the potential maliciousness of the file, quarantine the file, and/or delete the file. Additionally or alternatively, the systems described herein may perform security actions on other objects, such as blacklisting malicious URLs and/or IP addresses.

As discussed in connection with method 300 above, the systems and methods described herein may model malware distribution networks as a dynamic attribute graph and use label propagation, on top of a seed set of know benign and malicious files that are attached to the graph, to proactively identify malicious websites, URL, and/or files. The systems described herein may record file download information including but not limited to referrer URL, URL, parent URL, and/or download IP address. This category of information may enable the systems described herein to reconstruct the delivery network for both benign and malicious files. The systems described herein may propagate labels throughout the graph once the graph is constructed. Once the propagation process converges, the systems described herein may determine any node in the graph is malicious with a confidence level based on the availability reputation score data (i.e., nodes with more labelled neighbors may be labelled with a greater level of confidence). The output of the label propagation may then be used by the systems described herein and/or analysts querying the graph to detect potentially malicious activities.

Figure 6:
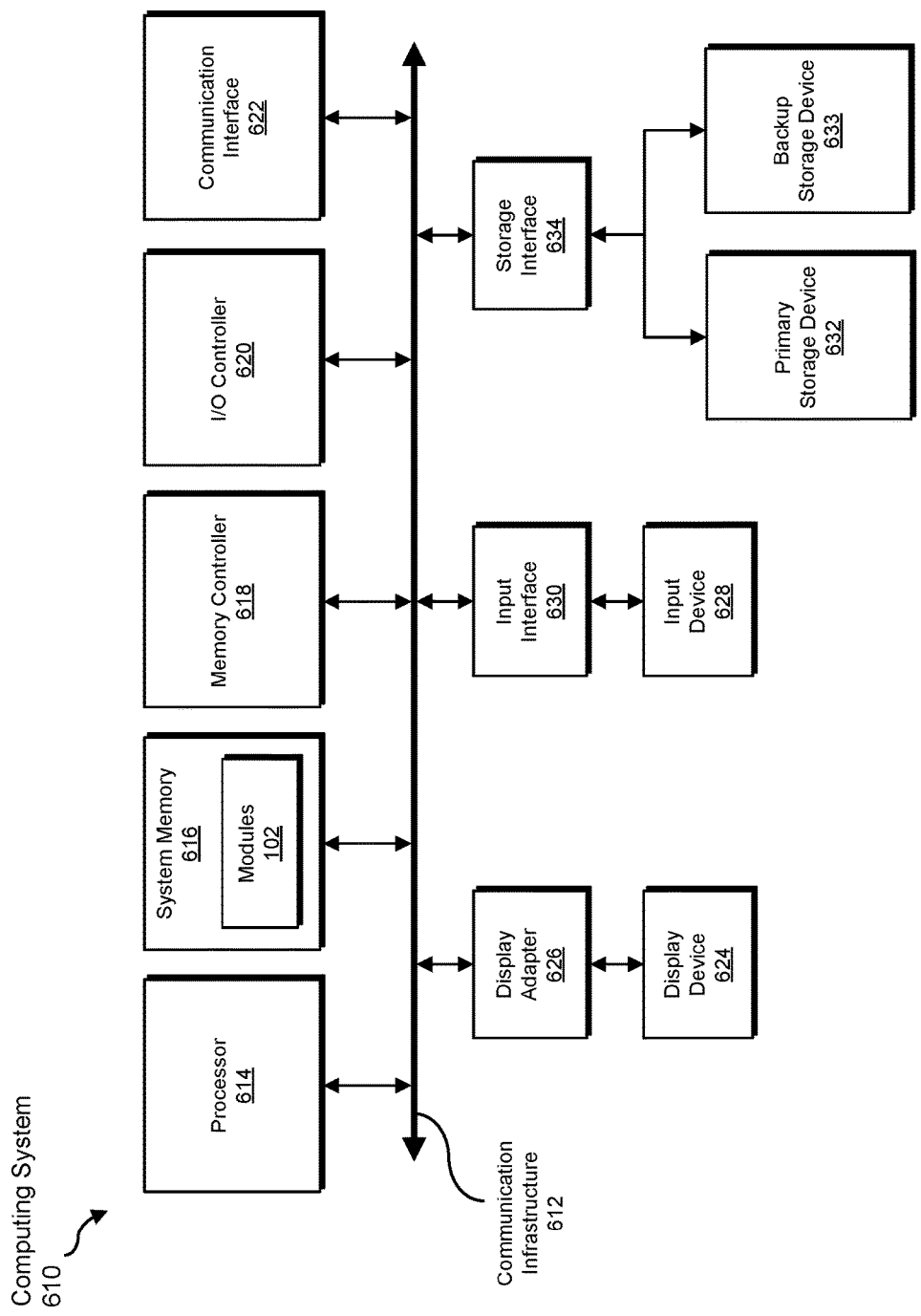
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616)

and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
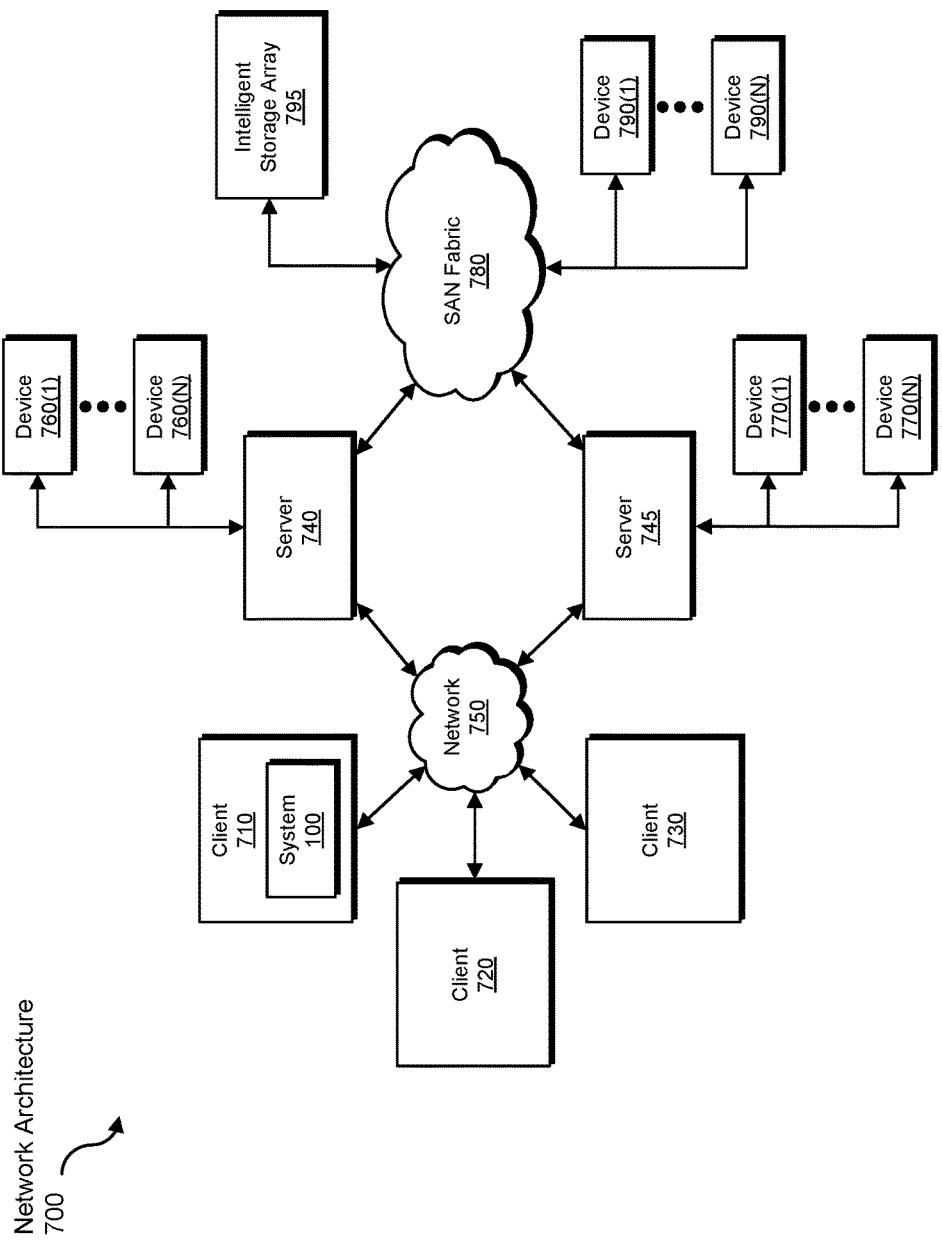
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for determining the reputations of unknown files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive file data to be transformed, transform the file data into a node, output a result of the transformation to a dynamic file relationship graph, use the result of the transformation to add to the dynamic file relationship graph, and store the result of the transformation to the dynamic file relationship graph. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining the reputations of unknown files, at least a portion of the method being performed by a computing device comprising at least one processor, the method comprising:
   identifying, by the computing device, a file that was downloaded by the computing device from an external file host;
   creating, by the computing device, a node that represents the file in a dynamic file relationship graph;
   connecting, by the computing device, the node in the dynamic file relationship graph with at least one other node that represents an attribute of the external file host, wherein connecting the node with the at least one other node comprises labeling an edge between the node and the at least one other node with a timestamp of the current time;
   determining, by the computing device, that the at least one other node connected to the node in the dynamic file relationship graph has a first reputation score and that the at least one other node exceeds a threshold for a number connected nodes with reputations;
   labeling, by the computing device, based on the at least one other node exceeding the threshold, the node with a second reputation score calculated based at least in part on the first reputation score of the at least one other node that represents the attribute of the external file host by using the dynamic file relationship graph to propagate the first reputation score from the at least one other node to the node that represents the file, wherein the attribute comprises an address associated with the external file host and wherein the address is utilized to reconstruct a delivery network for both benign and malicious files;
   determining, by the computing device, based on the second reputation score, that the file is malicious; and
   performing, by the computing device, a security action with respect to the malicious file to protect the computing device from the malicious file.

2. The computer-implemented method of claim 1, wherein identifying the file comprises determining that reputation data for the file is not currently stored in the dynamic file relationship graph.

3. The computer-implemented method of claim 1, wherein labeling the node with the second reputation score comprises averaging the first reputation score for the at least one other node connected to the node.

4. The computer-implemented method of claim 1, wherein the second reputation score comprises a percentage probability that the file is malicious.

5. The computer-implemented method of claim 1, further comprising, in response to labeling the node with the second reputation score, labeling an unlabeled node that is connected to the node with a new reputation score that is calculated at least in part using the second reputation score for the node.

6. The computer-implemented method of claim 1, wherein connecting the node with the at least one other node further comprises creating the at least one other node that represents the attribute of the external file host.

7. The computer-implemented method of claim 6, wherein creating the at least one other node comprises connecting the at least one other node with at least one additional node that represents at least one additional attribute of the external file host.

8. The computer-implemented method of claim 1, wherein the attribute of the external file host further comprises an additional file downloaded from the external file host and wherein the address comprises:
   an Internet protocol address of the external file host;
   a uniform resource locator of the external file host; and
   a referrer uniform resource locator of the external file host.

9. A system for determining the reputations of unknown files, the system comprising:
   an identification module, stored in memory, that identifies, by a computing device, a file that was downloaded by a computing device from an external file host;
   a creation module, stored in memory, that creates, by the computing device, a node that represents the file in a dynamic file relationship graph;
   a connection module, stored in memory, that connects, by the computing device, the node in the dynamic file relationship graph with at least one other node that represents an attribute of the external file host, wherein the node is connected with the at least one other node by labeling an edge between the node and the at least one other node with a timestamp of the current time;
   a labeling module, stored in memory, that:
      determines, by the computing device, that the at least one other node connected to the node in the dynamic file relationship graph has a first reputation score and that the at least one other node exceeds a threshold for a number connected nodes with reputations;
      labels, by the computing device, based on the at least one other node exceeding the threshold, the node with a second reputation score calculated based at least in part on the first reputation score of the at least one other node that represents the attribute of the external file host by using the dynamic file relationship graph to propagate the first reputation score from the at least one other node to the node that represents the file, wherein the attribute comprises an address associated with the external file host and wherein the address is utilized to reconstruct a delivery network for both benign and malicious files;
      determines, by the computing device, based on the second reputation score, that the file is malicious; and
      performs, by the computing device, a security action with respect to the malicious file to protect the computing device from the malicious file; and
   at least one physical processor configured to execute the identification module, the creation module, the connection module, and the labeling module.

10. The system of claim 9, wherein the identification module identifies the file by determining that reputation data for the file is not currently stored in the dynamic file relationship graph.

11. The system of claim 9, wherein the labeling module labels the node with the second reputation score by averaging the first reputation score for the at least one other node connected to the node.

12. The system of claim 9, wherein the second reputation score comprises a percentage probability that the file is malicious.

13. The system of claim 9, wherein the labeling module, in response to labelling the node with the second reputation score, labels an unlabeled node that is connected to the node with a new reputation score that is calculated at least in part using the second reputation score for the node.

14. The system of claim 9, wherein the connection module further connects the node with the at least one other node by creating the at least one other node that represents the attribute of the external file host.

15. A non-transitory computer-readable medium comprising one or more computer-readable instructions that, when executed by at least one processor of a computing device, cause the computing device to:

Identify, by the computing device, a file that was downloaded by the computing device from an external file host;

create, by the computing device, a node that represents the file in a dynamic file relationship graph;

connect, by the computing device, the node in the dynamic file relationship graph with at least one other node that represents an attribute of the external file host, wherein the node is connected with the at least one other node by labeling an edge between the node and the at least one other node with a timestamp of the current time;

determine, by the computing device, that the at least one other node connected to the node in the dynamic file relationship graph has a first reputation score and that the at least one other node exceeds a threshold for a number of connected nodes with reputations;

label, by the computing device, based on the at least one other node exceeding the threshold, the node with a second reputation score calculated based at least in part on the first reputation score of the at least one other node that represents the attribute of the external file host by using the dynamic file relationship graph to propagate the first reputation score from the at least one other node to the node that represents the file, wherein the attribute comprises an address associated with the external file host and wherein the address is utilized to reconstruct a delivery network for both benign and malicious files;

determine, by the computing device, based on the second reputation score, that the file is malicious; and perform, by the computing device, a security action with respect to the malicious file to protect the computing device from the malicious file.

16. The non-transitory computer-readable medium of claim 15, wherein the one or more computer-readable instructions cause the computing device to identify the file by determining that reputation data for the file is not currently stored in the dynamic file relationship graph.

17. The non-transitory computer-readable medium of claim 15, wherein the one or more computer-readable instructions cause the computing device to label the node with the second reputation score by averaging the first reputation score for the at least one other node connected to the node.

18. The non-transitory computer-readable medium of claim 15, wherein the second reputation score comprises a percentage probability that the file is malicious.

19. The non-transitory computer-readable medium of claim 15, wherein the one or more computer-readable instructions further cause the computing device, in response to labeling the node with the second reputation score, to label an unlabeled node that is connected to the node with a new reputation score that is calculated at least in part using the second reputation score for the node.

\* \* \* \* \*